No. 739,422. PATENTED SEPT. 22, 1903.
R. V. JONES.
COOKING UTENSIL.
APPLICATION FILED JUNE 28, 1902.
NO MODEL.
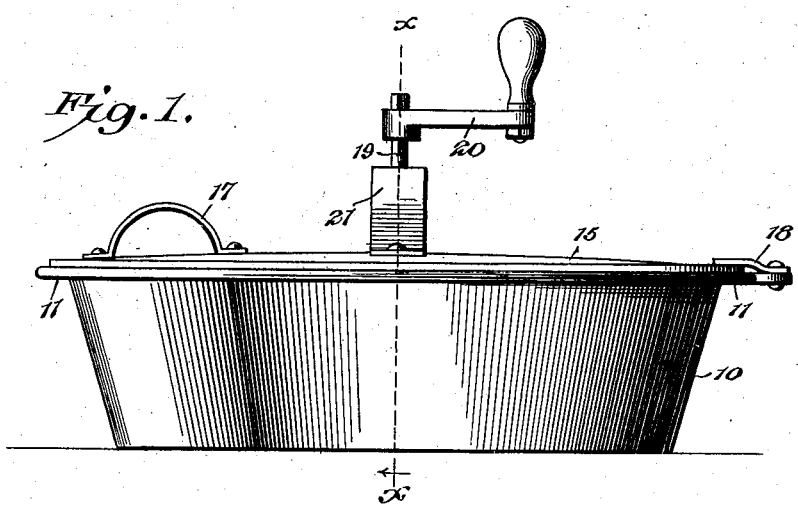
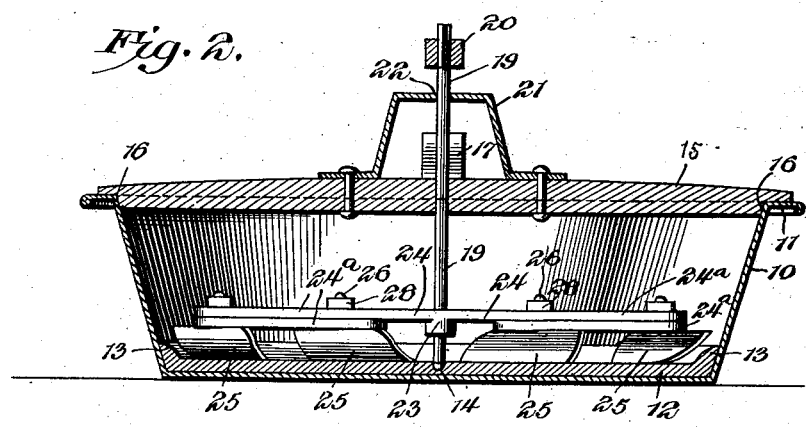
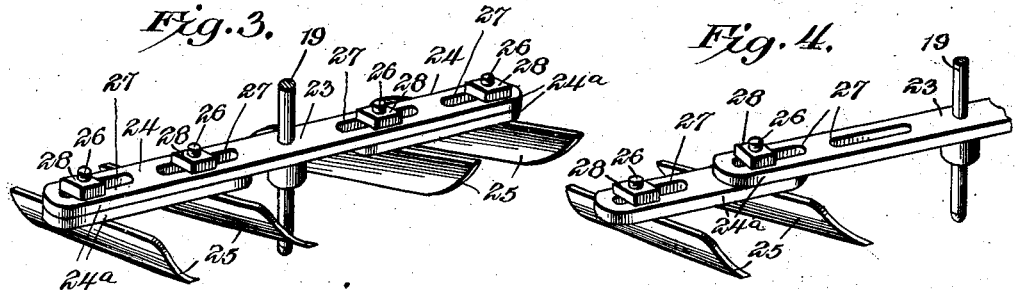
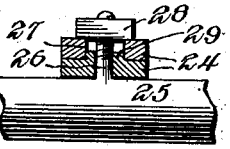
Witnesses
Howard D. Orr
B. H. Foster
Robert V. Jones, Inventor,
By E. G. Siggers
Attorney
THE NORRIS PETERS CO., PHOTO-LITHO., WASHINGTON, D. C.

No. 739,422.                                                                 Patented September 22, 1903.

UNITED STATES PATENT OFFICE.

ROBERT VINTON JONES, OF CANTON, OHIO.

COOKING UTENSIL.

SPECIFICATION forming part of Letters Patent No. 739,422, dated September 22, 1903.

Application filed June 28, 1902. Serial No. 113,648. (No model.)

*To all whom it may concern:*

Be it known that I, ROBERT VINTON JONES, a citizen of the United States, residing at Canton, in the county of Stark and State of Ohio, have invented a new and useful Cooking Utensil, of which the following is a specification.

The present invention relates to cooking utensils, and the object thereof is to provide an article of this character having mechanism which will permit the thorough and uniform stirring of the food without the necessity of raising the cover, thus avoiding the escape of steam and the segregated atomic particles of food and matter in which said food is cooked.

A further object is to provide stirring mechanism which may be adjusted to various sizes of vessels and to employ in connection therewith means which will prevent the burning of the food.

The preferred construction of the invention is shown in the accompanying drawings, wherein—

Figure 1 is a side elevation of the improved utensil. Fig. 2 is a vertical sectional view taken on the line X X of Fig. 1. Fig. 3 is a perspective view more clearly showing the construction of the arms and the connections of the stirrer-blades therewith. Fig. 4 is a detail perspective view showing one manner in which said arms may be extended. Fig. 5 is a detail sectional view through Fig. 4.

Similar numerals of reference designate corresponding parts in all the figures of the drawings.

The receptacle or vessel, which is designated 10, may be of any desired form or shape, preferably having an outstanding annular rim 11 at its upper edge. A supplemental bottom 12 is arranged within the vessel or receptacle and fits snugly upon the bottom thereof. This supplemental bottom is preferably though not necessarily constructed of aluminium and has an annular upstanding flange 13. It is imperforate and is provided with a centrally-disposed step-bearing socket 14. The cover 15 is arranged upon the receptacle and has a rabbet 16 in its edge, which receives the upper edge and flange 11 of the vessel, as clearly shown in Fig. 2. The cover is furthermore provided with a suitable handle 17, and a button 18, pivoted to the rim of the receptacle, holds said cover in place.

Passing through the center of the cover is a vertically-disposed shaft 19, having its lower end stepped in the bearing 14, its upper end projecting some distance above the cover and having a handle-crank 20 attached thereto. An upstanding bracket 21 is secured to the upper face of the cover 15 and is provided with an opening 22, through which the shaft passes, this bracket serving to prevent the lateral movement of the shaft and being especially useful when the mechanism is employed without the supplemental bottom 12.

To the lower portion of the shaft 19 is attached a cross-bar 23, that is spaced above the bottom 12. The opposite ends of said bar constitute outstanding arms 24. These arms are extensible, being formed of sections $24^a$, that are foldable, as shown in Fig. 2, though capable of being arranged in alinement and longitudinally adjustable, as illustrated in Fig. 4. Stirrer-blades 25 are attached to the arms, said blades consisting of curved plates that are movable over the bottom 12 and have upstanding shanks 26, passed through longitudinally-disposed slots 27, formed in the arm-sections. The stirrer-blades are thus revolubly adjustable on vertical axes upon the arms and are also longitudinally movable thereon; but they are normally held against such movements by clamping-nuts 28, threaded upon the upper ends of the shanks and bearing against the arms. The supplementary bottom, besides serving to prevent burning of food placed within the receptacle, also has a step-bearing and can be placed within a sheet-metal utensil that otherwise would not have a sufficiently thick bottom to permit the formation of a socket for the lower end of the shaft. The upstanding peripheral flange 13 serves as a guide to direct the material from the walls of the utensil to the stirrer-blades, which in turn move it toward the center, thus creating a continuous movement over the bottom.

When the stirring mechanism is employed in a small vessel, the sections of the arms are folded as shown in Fig. 2, and as this places the opening or the slots in alinement the shanks of the stirrer-blades are passed through said alined slots. This permits the adjustment of the blades with respect to one another, and they may be arranged at any angle desired. When the stirrer is placed within a larger vessel, the arms are extended, as shown, by securing the movable sections in projecting positions at the ends of the inner sections. They are held in this position by the shanks of certain of the stirrer-blades being passed through the alined openings, their pivotal movement being prevented by holding-lugs 29, carried by the movable sections and engaging in the slots of the inner sections.

It will be evident that by this construction food placed within the vessel can be thoroughly and uniformly stirred without the necessity of removing the cover, thus avoiding the objectionable spattering or escape of steam. The stirrer, furthermore, may be extended so that it can be used in vessels of different sizes.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with a cooking vessel, of a removable supplemental bottom fitted within the vessel and having a step-bearing, an upright shaft journaled in the bearing, an arm secured to the shaft, and stirrer-blades attached to the arm.

2. The combination with a cooking vessel, of a removable supplemental bottom fitted within the vessel and having a centrally-disposed step-bearing, a cover arranged upon the vessel, an upright shaft journaled in the bearing and passing through the cover, arms attached to the shaft, stirrer-blades secured to the arms and movable over the supplemental bottom, and a handle attached to the upper end of the shaft.

3. The combination with a vessel, of an upright shaft journaled therein, an outstanding arm carried by the shaft, a stirrer-blade mounted and revolubly adjustable on a vertical axis upon the arm, and means for fastening the blade against its revoluble movement upon said arm.

4. The combination with a vessel, of an upright shaft journaled therein, an outstanding arm carried by the shaft, a stirrer-blade slidably mounted upon the arm and revolubly adjustable on a vertical axis, and means for fastening the blade against movement in said arm.

5. The combination with a vessel, of an upright shaft journaled therein, an outstanding arm carried by the shaft and having a slot, a stirrer-blade having a shank slidably mounted and revolubly adjustable on a vertical axis in the slot, and a clamping-nut threaded upon the shank and arranged to hold said stirrer-blade against movement on the arm.

6. The combination with a vessel, of an upright shaft journaled therein, oppositely-disposed outstanding arms carried by the shaft, said arms having longitudinally-disposed slots, stirrer-blades having shanks that are slidably mounted and revolubly adjustable on vertical axes in the slots, and clamping-nuts threaded upon the shanks and bearing against the arms to hold the stirrer-blades against movement on said arms.

7. The combination with a vessel, of a shaft journaled therein, an extensible arm comprising slidably-associated sections having slots, one of said sections being attached to the shaft, stirrer-blades mounted upon the sections, one of said blades having a shank that passes through the slots of both sections and constitutes means for fastening them together.

8. The combination with a cooking vessel, of a supplementary bottom fitted in the vessel and having an upstanding peripheral flange at its edge, and stirrer-blades revolubly mounted in the vessel and having their ends movable alongside the upstanding peripheral flange.

In testimony that I claim the foregoing as my own I have hereto affixed my signature in the presence of two witnesses.

ROBERT VINTON JONES.

Witnesses:
HOMER V. BRIGGLE,
VICTOR D. NIST.